(12) United States Patent
Grill

(10) Patent No.: US 6,234,202 B1
(45) Date of Patent: *May 22, 2001

(54) BALANCED FLUID CONTROL VALVE

(75) Inventor: Benjamin Grill, Woodland Park, CO (US)

(73) Assignee: Sturman BG, LLC, Woodland Park, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/499,404

(22) Filed: Feb. 7, 2000

Related U.S. Application Data

(63) Continuation of application No. 09/020,535, filed on Feb. 9, 1998, now Pat. No. 6,116,276.

(51) Int. Cl.[7] .................................................. F15B 13/044
(52) U.S. Cl. .............................. 137/596.17; 251/129.07; 251/129.17
(58) Field of Search ................ 137/596.17; 251/129.07, 251/129.17

(56) References Cited

U.S. PATENT DOCUMENTS

| Re. 34,261 | * | 5/1993 | Sule ............................ 137/625.65 X |
| 2,322,911 | | 6/1943 | Beam . |
| 3,683,239 | | 8/1972 | Sturman . |
| 3,743,898 | | 7/1973 | Sturman . |
| 4,624,285 | * | 11/1986 | Perach ............................ 137/625.65 |
| 4,641,686 | * | 2/1987 | Thompson ....................... 137/625.65 |
| 4,741,365 | | 5/1988 | Van Ornum . |
| 4,857,842 | | 8/1989 | Sturman et al. . |
| 4,870,892 | | 10/1989 | Thomsen et al. . |
| 5,007,458 | * | 4/1991 | Marcus et al. ............... 251/129.17 X |
| 5,345,857 | * | 9/1994 | Murphy ....................... 251/129.17 X |
| 5,598,871 | | 2/1997 | Sturman et al. . |
| 5,640,987 | | 6/1997 | Sturman . |
| 5,720,261 | | 2/1998 | Sturman et al. . |
| 6,035,895 | * | 3/2000 | Grill et al. ................... 251/129.07 X |
| 6,116,276 | * | 9/2000 | Grill ................................ 137/596.17 |

FOREIGN PATENT DOCUMENTS

| 1 550 322 | 1/1969 | (DE) . |
| 1 550 632 | 1/1970 | (DE) . |
| 1 475 930 | 10/1970 | (DE) . |
| 1 526 630 | 9/1978 | (GB) . |

OTHER PUBLICATIONS

Machine Design, Feb. 21, 1994, "Breakthrough in Digital Valves," Carol Sturman; Eddie Sturman.

(List continued on next page.)

*Primary Examiner*—Gerald A. Michalsky
(74) *Attorney, Agent, or Firm*—Blakely, Sokoloff, Taylor & Zafman LLP

(57) ABSTRACT

A fluid control valve housing has first and second connection ports, and first and second valve ports. First and second valves, adjacent to the valve ports, are attached to a transfer tube that extends through the housing. A spring outwardly biases the valves. A solenoid moves the transfer tube to close the first valve port and open the second valve port. A return spring moves the transfer tube to close the second valve port and open the first valve port, allowing fluid communication between the first and second connection ports. A first seal, having an effective area approximately equal to the area of the first valve port, is attached to the transfer tube to seal the return spring. A second seal, having an effective area approximately equal to the area of the second valve port, is attached to the transfer tube to seal the solenoid.

4 Claims, 2 Drawing Sheets

OTHER PUBLICATIONS

SAE Technical Paper Series, Mar. 1–4, 1999, "Digital Valve Technology Applied to the Control of an Hydraulic Valve Actuator," Kathleen M. Misovec et al.

JSME International Journal, Series C, vol. 39, No. 3. 1996, "Application of Unified Predictive Control to On/Off Comtrol of Hydraulic System Driven by Fast–Switching Solenoid Valves," Carlos Eduardo Jeronymo et al., pp. 515–520.

SAE Technical Paper Series, Feb. 23–26, 1998, "Adaptive Lift Control for a Camless Electrohydraulic Valvetrain," Mark D. Anderson et al., pp. 135–142.

"Advanced Control System Design," Bernard Friedland, New Jersey Institute of Technology, Library of Congress Cataloging–in–Publication Data, 1996.

"Applied Optimal Control, Optimization, Estimation, and Control," Arthur E. Bryson, Jr. et al. Hemisphere Publishing Corporation, 1975.

Diesel Progress, Apr. 1997, "Developments in Digital Valve Technology," Rob Wilson.

"The Swing to Cleaner, Smarter Hydraulics," Stuart Brown, exerpt, pp. 152(A)(F)(J)(K), Fortune Magazine, Jun. 9, 1997.

Diesel Progress, Aug. 1997, "Vickers Taking Closer Aim at Mobile Markets," Mike Brezonick.

* cited by examiner

BALANCED FLUID CONTROL VALVE

CROSS REFERENCE TO RELATED APPLICATION

This application is a continuation of application Ser. No. 09/020,535, filed on Feb. 9, 1998, now issued as U.S. Pat. No. 6,116,276.

BACKGROUND OF THE INVENTION

1. Field of the Invention

The present invention relates to a latching, dynamically balanced, three-way fluid control valve.

2. Description of Related Art

Insecticides are commonly distributed onto a field by a sprinkler system that is mounted to a truck. The sprinkler system has a plurality of spray nozzles that are coupled to a source of pressurized insecticide. The fluid is typically sprayed from both sides of the vehicle to maximize the spray radius of the system. When moving along the perimeter of a field it is not always desirable to spray from both sides of the truck. For this reason, it is desirable to provide a number of control valves that allow the operator to control the flow of fluid from the nozzles.

Fluid control valves typically contain a spool that controls the flow of fluid between a number of ports located in the valve housing. The flow of fluid between the ports is determined by the position of the spool. By way of example, in a three-way valve, when the spool is in one position a supply port is in fluid communication with an outlet cylinder port. When the spool is in a second position the cylinder port is in fluid communication with a return port. The position of the spool is typically controlled by a solenoid(s).

The spools have a number of channels or grooves that align the ports of the valve housing. The channels are relatively narrow and are susceptible to clogging, particularly when used in an agricultural environment that has a relatively large amount of dirt and dust. Additionally, the narrow channels produce a relatively large pressure drop across the valve. It would be desirable to provide a three-way fluid control valve that is not susceptible to clogging and does not produce a significant pressure drop across the valve.

Solenoid controlled fluid valves typically require a continuous supply of power to actuate the solenoids. The requirement for continuous power increases the power supply and energy consumption of the system. Additionally, spool valves are dynamically unbalanced such that the solenoids must overcome the pressure of the working fluid to move the spool. The additional work required to overcome the fluid pressure consumes more power and reduces the energy efficiency of the system. Therefore it would be desirable to provide a solenoid actuated three-way control valve that is dynamically balanced, is not susceptible to clogging, does not produce significant pressure drops, and can be actuated without a continuous supply of power.

SUMMARY OF THE INVENTION

The present invention is a latching, dynamically balanced, fluid control valve. The valve includes a housing which has a supply port, a cylinder port and a return port. Fluid communication between the supply port and the cylinder port is controlled by a first valve that opens and closes a first valve port of the housing. Fluid communication between the supply port and the cylinder port is controlled by a second valve that opens and closes a second valve port. The valves and ports provide relatively large valve openings that are not susceptible to clogging and do not produce significant pressure drops in the valve.

The first and second valves are connected to a transfer tube that is coupled to a solenoid and a return spring. The solenoid can be actuated to move the tube and valve from a first position, which allows fluid communication between the cylinder port and the supply port, to a second position that allows fluid communication between the cylinder port and the return port. The spring returns the valves to the first position. The solenoid is actuated by short digital pulses that latch the transfer tube and valves into position. The solenoid and spring are sealed by a pair of seals that each have an effective area which is approximately equal to the effective area of the valves. Each seal is located opposite from a valve seat so that opposing fluid pressures are applied to the seal and the valve. The opposing pressures create a net force on the transfer tube that is approximately zero, thus providing a balanced fluid valve that requires less energy to actuate.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
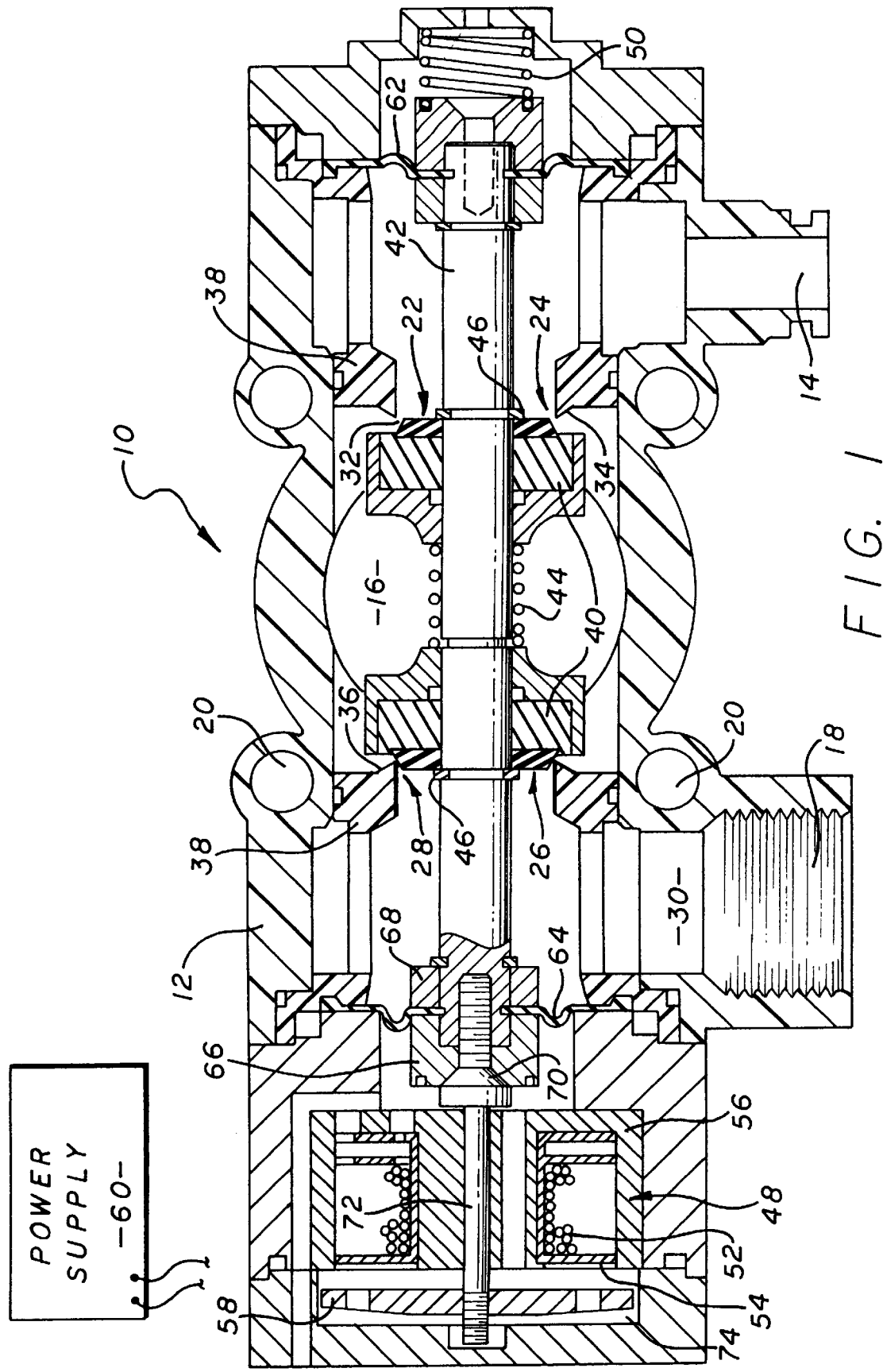
FIG. 1 is a cross-sectional view of a fluid control valve of the present invention with the valve in a first position.

Referring to the drawings more particularly by reference numbers, FIG. 1 shows a fluid control valve 10 of the present invention. The control valve 10 is used to control the flow of fluid in a fluid system. By way of example, the fluid system may be a sprinkler system that sprays insecticide from a moving vehicle. The valve 10 has a housing 12 which contains a supply port 14, a cylinder port 16 and a return port 18. The supply port 14 may be connected to a supply of fluid such as an insecticide. The outlet port 16 may be connected to an output device such as a spray nozzle of a sprinkler system. The return port 18 may be coupled to a reservoir, or the input port of a pump. The housing 12 is preferably constructed from a plastic material such as polypropylene that is resistant to chemicals such as insecticides. The plastic material may be reinforced with 15% glass to increase the strength of the housing 12. The housing 12 may have mounting holes 20 to allow the valve 10 to be mounted to a substrate (not shown). Although three ports 14, 16 and 18 are shown and described, it is to be understood that the valve may have any number of ports. For example, the valve may have a single inlet port and a single outlet port.

The valve 10 has a first valve 22 located adjacent to a first valve port 24 and a second valve 26 located adjacent to a second valve port 28. The first valve 22 controls the flow of a working fluid 30 through the first port 24. The second valve 26 controls the flow of the working fluid 30 through the second port 28. The valves 22 and 26 cooperate with valves seats 34 and 36 to close the ports 24 and 28. The valve seats 34 and 36 may extend from a pair of inner sleeves 38. The inner sleeves 38 are preferably constructed from a molded plastic material that is relatively soft and thus minimizes the wear on the valves. Additionally, the valves 22 and 26 may each have a plug 40 that is constructed from a relatively soft material such as a hardened rubber. The rubber plug 40 reduces and compensates for wear on the valve assembly. When in an open position the valves are separated from the seats by an annular gap 32. The annular gaps 32 provide a relatively large flow area which minimizes the pressure drop across the valve and provides a valve assembly that is less susceptible to clogging. In the preferred embodiment, the valves 22 and 26 have a diameter of approximately 0.85 inches and are separated from the seats by a space 0.165 inches wide.

The valves 22 and 26 are attached to a transfer tube 42 that extends through the housing 12. The first 22 and second 26 valves are separated by a spring 44 that biases the valves in an outward axial direction. The spring 44 insures that the valves are seated onto the valves seats when in a closed position. The valve 10 has a pair of clips 46 that attach the valves to the tube 42. The transfer tube 42 is coupled to a solenoid 48 and a return spring 50. When the solenoid 48 is actuated the transfer tube 42 moves from a first position to a second position. In the second position the first valve 22 is pressed against the valve seat 34 to prevent fluid from flowing through the first valve port 24. The second valve 26 is separated from the second seat 36 to allow fluid communication between the cylinder port 16 and the return port 18. When the solenoid 48 is de-activated that return spring 50 moves the transfer tube 42 back to the first position. In the first position, the second valve 26 is pressed against the valve seat 36 to prevent fluid flow into the return port 18. The first valve 22 is unseated from the valve seat 34 to allow fluid communication between the cylinder port 16 and the supply port 14.

The solenoid 48 has a coil 52 that is wrapped around a bobbin 54. The bobbins 54 are mounted to a magnetic core 56. The core 56 is coupled to an armature 58. The armature 58 is pulled into contact with the core 56 when the solenoid 48 is actuated. The armature 58 is pushed away from the core 56 when the solenoid 48 is de-activated. The solenoid 48 receives power from a power supply 60. The power supply 60 provides digital pulses to the coil 52 to actuate the solenoid 48. The armatures 58 and core 56 are preferably constructed from a magnetic steel material which has enough residual magnetism to maintain the armature 58 in contact with the core even when power to the coil 46 is terminated. The attractive residual magnetic forces allow the solenoids to be latched by digital signals. In the preferred embodiment, the armatures 58 and core 56 are constructed from hardened 52100 or 440c steel. The solenoid 48 can be actuated with a voltage of one polarity and de-activated with a voltage having an opposite polarity. The opposite polarity will induce a force to separate the armature 58 from the core 56. Latching the valve into position with digital pulses consumes less power than valves of the prior art which require a continuous supply of power to maintain the position of the valve.

The valve 10 further contains a first seal 62 that seals the return spring 50 and a second seal 64 that seals the solenoid 48. The seals 62 and 64 are typically diaphragms that are captured by the inner sleeves 38 and the housing 12. Each seal 62 and 64 is attached to transfer tube 42 by a head 66 and a washer 68. The heads 66 are fastened to the tube 42 by screws 70. The armature 58 has a pin 72 that engages the screw of the second seal 64. The housing 12 and second seal 64 define a chamber 74. The chamber 74 may contain a glycol based fluid that lubricates the armature 58 and core 56, and reduces the wear of the solenoid components. The seals 62 and 64 each have an effective area that is in fluid communication with the working fluid 30 of the valve. The seal area is approximately equal to the area of the valve ports 24 and 28. Each seal area is located opposite from a valve so that there are opposing fluid pressure forces on the seals and the valves. The opposing forces create a net fluid force on the transfer tube 34 that is approximately zero. The zero net force dynamically balances the valve so that the solenoid does not have to generate work to overcome the fluid pressure when switching the tube 42 from one position to another position.

Figure 2:
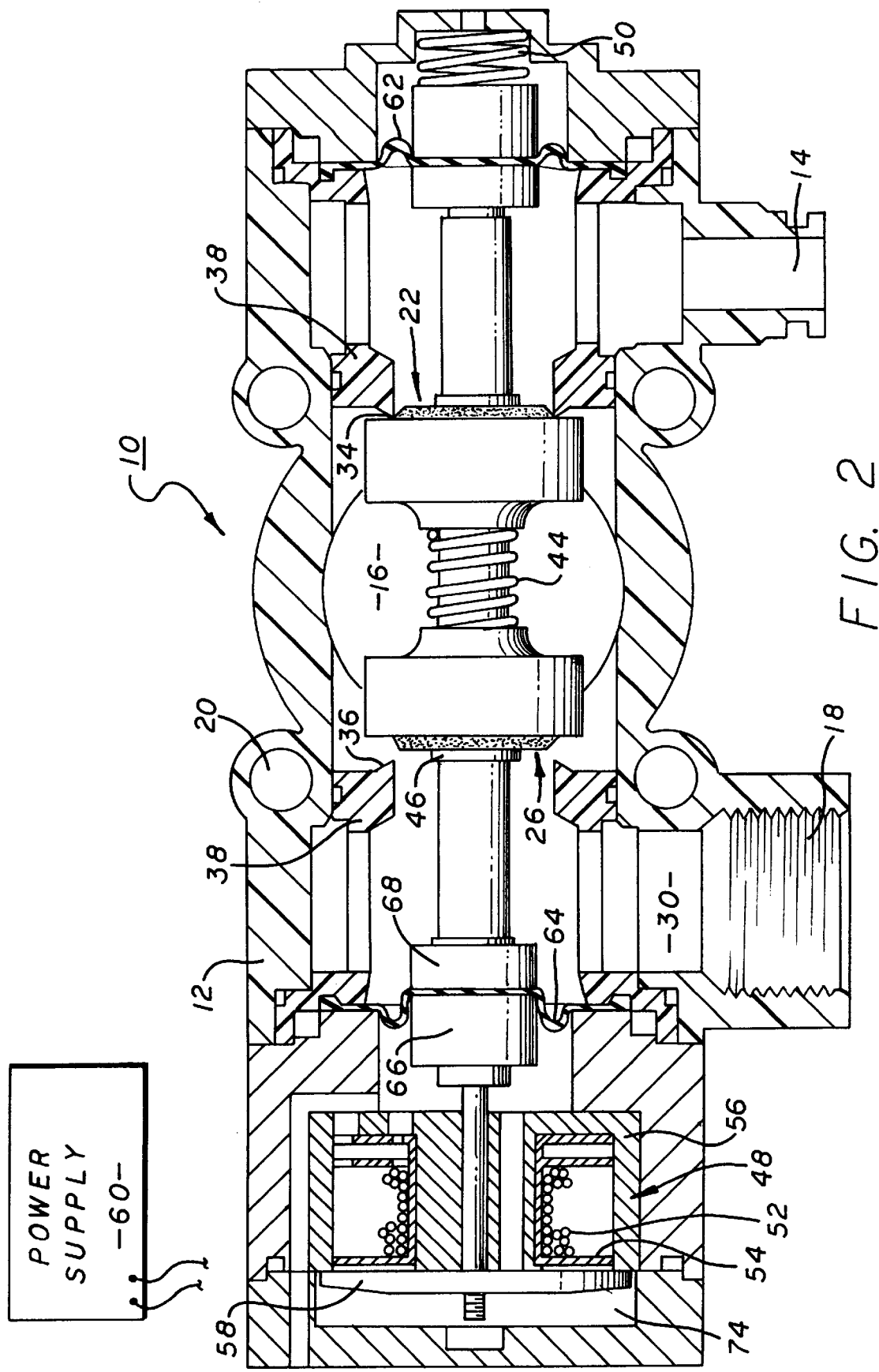
FIG. 2 is a cross-sectional view of the fluid control valve with the valve in a second position.

In operation, the power supply 60 provides a digital pulse to actuate the solenoid 48. As shown in FIG. 2, the solenoid 48 pulls the armature 58 and moves the transfer tube 42 to the second position, so that the working fluid 30 flows from the cylinder port 14 to the return port 18. Power to the first solenoid 48 is then terminated, wherein the hystersis of the pole and armature material maintain the transfer tube 42 in the first position.

To change the flow of the fluid, the power supply 60 provides a digital pulse to de-activate the solenoid 48. As shown in FIG. 1, the return spring 50 moves the transfer tube 42 back to the first position. In the first position, the working fluid 30 flows from the supply port 16 to the cylinder port 14. The present invention thus provides a latching, dynamically balanced, three-way control valve that has a lower pressure drop and is less susceptible to clogging than valves of the prior art.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A fluid control valve that controls a flow of a working fluid, comprising:

a housing that has a first connection port and a second connection port, said housing further having a first valve port and a second valve port;

a transfer tube that extends through said housing;

a first valve that is attached to said transfer tube and located adjacent to said first valve port;

a second valve that is attached to said transfer tube and located adjacent to said second valve port;

a spring that is coupled to said first valve and said second valve to bias said first and second valves in an outward direction;

a solenoid that moves said transfer tube from a first position to a second position such that said first valve closes said first valve port and said second valve port is open;

a return spring that moves said transfer tube from the second position to the first position such that said second valve closes said second valve port and said first valve port is open to allow fluid communication between said first connection port and said second connection port;

a first seal that is attached to said transfer tube and which seals said return spring, said first seal having an effective area, that is in fluid communication with the working fluid, and is approximately equal to said area of said first valve port; and, a second seal that is attached to said transfer tube and which seals said solenoid, said second seal having an effective area, that is in fluid communication with the working fluid, and is approximately equal to said area of said second valve port.

2. The fluid control valve of claim 1, further comprising a third connection port, said second valve allowing fluid communication between said second connection port and said third connection port when said second valve is open.

3. The fluid control valve of claim 1, wherein said housing is constructed from a plastic material.

4. The fluid control valve of claim 1, further comprising a power supply that provides a digital pulse that latches said solenoid and said transfer tube to the second position.

* * * * *